(12) United States Patent
De Boer

(10) Patent No.: US 10,691,118 B2
(45) Date of Patent: Jun. 23, 2020

(54) INFORMATION RETRIEVAL SYSTEM AND METHOD

(71) Applicant: PB Innovate Pty Ltd, Ringwood, Victoria (AU)

(72) Inventor: Pieter De Boer, Lilydale (AU)

(73) Assignee: PB Innovate Pty Ltd, Ringwood (AU)

( * ) Notice: Subject to any disclaimer, the term of this patent is extended or adjusted under 35 U.S.C. 154(b) by 458 days.

(21) Appl. No.: 15/316,502

(22) PCT Filed: Jun. 3, 2015

(86) PCT No.: PCT/AU2015/050303
§ 371 (c)(1),
(2) Date: Dec. 5, 2016

(87) PCT Pub. No.: WO2015/184503
PCT Pub. Date: Dec. 10, 2015

(65) Prior Publication Data
US 2017/0160715 A1   Jun. 8, 2017

(30) Foreign Application Priority Data

Jun. 3, 2014 (AU) ................................ 2014902127

(51) Int. Cl.
*G05B 23/02* (2006.01)
*G06F 3/048* (2013.01)
(Continued)

(52) U.S. Cl.
CPC ..... *G05B 23/0267* (2013.01); *G05B 23/0205* (2013.01); *G05B 23/0216* (2013.01);
(Continued)

(58) Field of Classification Search
None
See application file for complete search history.

(56) References Cited

U.S. PATENT DOCUMENTS 5,850,490 A    12/1998  Johnson
2002/0163427 A1  11/2002  Eryurek et al.
(Continued)

FOREIGN PATENT DOCUMENTS

JP    05-307692    11/1993
JP    10-283023    10/1998
(Continued)

OTHER PUBLICATIONS

Oct. 17, 2018 Examination Report issued in New Zealand Patent Application No. 724268.
(Continued)

*Primary Examiner* — Qing Yuan Wu
(74) *Attorney, Agent, or Firm* — Gregory A. Walters; Walters IP Law

(57) ABSTRACT

An information retrieval system (1) for use with a control system (10) in a plant having processes and/or pieces of equipment, the control system (10) connected with at least one input component and/or at least one output component for monitoring and controlling the processes and the pieces of equipment, the control system enabled to produce state indications (12) from the input and output components indicating potential fault in one or more of: at least one input and/or output component; at least one process; at least one piece of equipment; a part of the control system (10); or, a part of the plant.

30 Claims, 12 Drawing Sheets

(51) Int. Cl.
*G06F 11/00* (2006.01)
*H04L 12/24* (2006.01)
(52) U.S. Cl.
CPC ..... *G05B 23/0218* (2013.01); *G05B 23/0272* (2013.01); *G05B 23/0275* (2013.01); *G06F 3/048* (2013.01); *H04L 41/065* (2013.01); *H04L 41/0645* (2013.01); *G06F 11/006* (2013.01); *H04L 41/0677* (2013.01)

(56) References Cited

U.S. PATENT DOCUMENTS

| | | |
|---|---|---|
| 2004/0024662 A1 | 2/2004 | Gray et al. |
| 2007/0143076 A1 | 6/2007 | Walacavage et al. |
| 2013/0007004 A1 | 1/2013 | Rai et al. |
| 2013/0167016 A1 | 6/2013 | Hadley et al. |
| 2016/0092433 A1 | 3/2016 | Gluck et al. |

FOREIGN PATENT DOCUMENTS

| | | |
|---|---|---|
| WO | 97/45779 A1 | 12/1997 |
| WO | 2015/184503 A1 | 12/2015 |

OTHER PUBLICATIONS

Mar. 19, 2018 Examination Report issued in Indonesian Patent Application No. P00201709280.
Mar. 16, 2018 Office Action issued in Chilean Patent Application No. 201603127.
Jan. 8, 2018 Search Report issued in European Patent Application No. 15802788.8.
Jan. 30, 2018 Examination Report issued in New Zealand Patent Application No. 724268.
Dec. 22, 2017 Examination Report issued in New Zealand Patent Application No. 724268.
Dec. 19, 2017 Search Report issued in European Patent Application No. 15802788.8.
Jul. 17, 2015 Search Report issued in International Patent Application No. PCT/AU2015/050303.
Jul. 17, 2015 Written Opinion issued in International Patent Application No. PCT/AU2015/050303.
Japanese Examination Report for Japanese Patent Application No. 2016-570079, dated Jul. 4, 2019, 4 pages.
PCT International Search Report for PCT International Application No. PCT/AU2017/000213, dated Jan. 11, 2018, 8 pages.
PCT Written Opinion for PCT International Application No. PCT/AU2017/000213, dated Jan. 11, 2018, 8 pages.
PCT International Preliminary Report on Patentability for PCT International Application No. PCT/AU2017/000213, dated Oct. 24, 2018, 27 pages.
International-Type Search Report for Australian Provisional Patent Application No. 2016904138, dated Aug. 29, 2017, 7 pages.
Australian Examination Report for Australian Patent Application 2015271646, dated Sep. 16, 2016, 2 pages.
Chinese Examination Report for Chinese Patent Application 201580029869.1, dated May 29, 2019, 16 pages.
European Examination Report for European Patent Application 15802788.8, dated May 21, 2019, 11 pages.
Indonesian Examination Report for Indonesian Patent Application S00201609168, dated Oct. 8, 2018, 2 pages.
Israeli Examination Report for Israeli Patent Application 249235, dated Jan. 13, 2019, 4 pages.
New Zealand Further Examination Report for New Zealand Patent Application 724268, dated Jun. 20, 2018, 6 pages.

INFORMATION RETRIEVAL SYSTEM AND METHOD

FIELD OF THE INVENTION

The present invention relates to an information retrieval system and an information retrieval method. The system and/or method may be particularly useful for control systems, such as supervisory control and data acquisition (SCADA) systems, programmable logic controllers (PLC) or a de-centralized control system (DCS). Further, the information retrieval system and/or method may be particularly useful for assisting with fault identification in the control system.

BACKGROUND OF THE INVENTION

Control systems, such as SCADA, PLC and DCS type systems are used for monitoring and controlling equipment and processes often in large factories or plants, such as manufacturing, mining and the like. Control systems allow an operator to easily view what is occurring with the equipment and/or processes, usually in real time and often in a simplified diagrammatic format. Control systems may also be referred to as alarm monitoring systems, and monitoring systems.

When used in shipping, control systems may sometimes be referred to as vessel monitoring systems, main engine monitoring systems, ballast (control) systems, power management systems, or the like. Control systems have a vast number of applications in diverse fields and industries.

If equipment or processes fail, or do not work at optimum capacity, then the control system is enabled to send an alarm which is received by the operator so that he or she can attend to rectifying a problem causing the alarm.

Fault finding of (mainly) electrical problems is frequently very time-consuming. This leads to a great deal of down time for a factory or the plant, which can be very costly. The fault resolution process, in one view, can be divided into two parts: determining of the location and nature of the fault, and fault rectification.

Fault rectification is normally fairly quick, but the time required for determining of the location and nature of the fault varies from, say, 15 minutes to days in some examples. The actual time for determining of the location and nature of the fault depends on the skills of a person tasked with fixing the fault, the tools that are available to that person and the complexity of the installation and the fault. Frequently, multiple disciplines are required to complete the fault finding process.

Some organizations compile a knowledge base of faults and their potential solutions, and combine this with the procedures to minimize time required for determination of the location and nature of the fault. The method still depends heavily on the available skills of the maintenance personnel involved with the fault finding.

This problem has, to date, not been solved because of the high level of customization (of the automation systems) that is needed to provide the required level of information and guidance to reduce the time for the location of the fault to a short, predictable and repeatable time.

Solving the above-mentioned problem is further complicated as there is no logical or logistical link between the entities that each contain part of a solution for dealing with determining of the location and nature of a fault. Each entity is typically created by tools from a different vendor.

Presently, most or all alarm conditions in a control system are displayed on a control screen of the control system (for example, a SCADA system screen or interface). The annunciated alarms (in this case, true alarms) are intended to alert an operator to a process or equipment problem that needs to be rectified, such as high temperature or high level, slow rotation, and other such process and/or equipment problems that can occur in a factory, a plant or the like. This type of rectification action commonly falls within the capabilities of operating or maintenance personnel.

As the alarm conditions are generated by sensors or contacts that are connected to the control system by means of cables and wires, it happens regularly that the sensors, contacts, wires, cables or their connections fail. Such a situation will generate a fault condition that does not exist (which may be a false alarm) and the location of the fault will need to be identified before rectification can occur. This sort of situation leads to long periods of time being spent in determining of the location and nature of the fault, as previously discussed. The cause of this type of problem is typically much harder to identify than, for example, problems in process or equipment.

Fault finding of problems in the control system, the input components, the output components and/or connections in wires and other items usually requires one or more personnel using a combination of skills and specialist knowledge or intuition to identify the fault location and nature.

Usually the fault finding process involves the following steps:

(1) Analysis of the annunciated alarm in order to identify how the alarm is generated and thus which inputs and outputs of the control system are associated with this alarm. This frequently requires specialist knowledge and tools that may or may not be available at the facility, being the factory or plant. This step can be a very time-consuming process;

(2) Determine the relevant drawing(s) in hard or soft copy. These drawings may be available at the facility, but may also be off-site. The time required for this step depends on the availability of the drawings, whether the drawings are well-indexed, how familiar the maintenance personnel is with the installation and the documentation, and may also depend on factors such as if the documentation has been properly catalogued and stored;

(3) Frequently additional information is required in the form of data sheets for equipment such as sensors and the like. Similarly to the process in step 2, the time required depends on such factors as data sheet availability, indexing, cataloguing, familiarity etc.; and, (4) Only when steps 1, 2 and/or 3 have been completed can the real fault finding, identification and rectification of the process and/or equipment, or the input and/or output components and/or the control system begin.

SUMMARY OF THE INVENTION

In one aspect, the present invention provides an information retrieval system for use with a control system in a plant having processes and/or pieces of equipment, the control system connected with at least one input component and/or at least one output component for monitoring and controlling the processes and the pieces of equipment, the control system enabled to produce state indications from the input and output components indicating potential fault in one or more of: at least one input and/or output component; at least one process; at least one piece of equipment; a part of the control system; or, a part of the plant, the information retrieval system including: an interface in communication with the control system and for receiving the state indications; an information module for storing information about the input components, the output components, the processes, the pieces of equipment and the plant, wherein the stored information is linked with the state indications, and wherein the stored information is segmented so that the information linked with a given state indication is relevant to one or more of the: input and/or output component; the process; the piece of equipment; the part of the control system or the part of the plant associated with the given state indication; and, a user interface for controlling the information retrieval system; such that, when the information retrieval system receives a state indication, the user can operate the user interface to retrieve the relevant linked stored information for that state indication.

In another aspect, the present invention provides a method of retrieving information for a control system using an information retrieval system as described in the previous paragraph.

SUMMARY OF SOME OPTIONAL EMBODIMENTS OF THE INVENTION

In one embodiment the information retrieval system includes a segmenting and linking module for selectively segmenting stored information and selectively linking the segmented stored information with one or more state indications.

In another embodiment, if the stored information is a multipage document, the segmenting and linking further includes inputting one or more page numbers containing information relevant to the state indication, such that the retrieved information includes only that page or those pages. The segmenting and linking may further include inputting information such that at least one part of the retrieved information is highlighted.

In other optional embodiments the information includes diagrammatic information, including one or more of: circuit diagrams; electrical diagrams; circuit layout diagrams; hydraulic diagrams; pneumatic diagrams; loop diagrams; and, process flow diagrams. The information may also include non-diagrammatic information, including data sheets. When at least one component depicted in the diagrammatic information is associated with a relevant data sheet about that component, the segmenting and linking further includes inputting information such that the retrieved information includes the diagrammatic information and the relevant data sheet. In embodiments, the at least one component has a unique identification, which is input for association with the relevant stored information.

In yet a further embodiment when a state indication is displayed on the user interface, the state indication and related inputs and/or outputs are hyperlinked such that activating the hyperlink retrieves the relevant stored information.

In yet another embodiment the retrieved information is output by an output means, including being printed by a printer, or being transferred to a portable electronic device with a display screen, so that the user can view the retrieved information at or near a location where maintenance occurs.

In yet further embodiments the state information includes one or more of alarms and input/output status indications.

In another optional embodiment the control system input and output components include any one or more of: physical (system) inputs and/or outputs, sensors, switches, transmitters, transducers, remote terminal units (RTUs), programmable logic controllers (PLCs), contacts, wires, cables, connections, electrical circuits, electrical components, electro-mechanical components, electronic components, hydraulic components, pneumatic components and actuators.

In another embodiment the control system includes a supervisory control and data acquisition (SCADA) system; a programmable logic controller (PLC); or, a de-centralized control system (DCS).

In optional embodiments, the user interface is a graphic display. Further, the user interface may also comprise a user interface of the control system.

In one optional embodiment, the information retrieval system is embedded within the control system.

In an embodiment, when the control system also produces status indications about input and/or output components and/or processes and/or equipment, the control system interface of the information retrieval system is able to receive information associated with the status indications, and at least some of the information module stored information is linked with the status indications.

In another embodiment, the information about input and output components includes diagrammatic information, including one or more of: circuit diagrams, circuit layout diagrams, hydraulic diagrams, pneumatic diagrams, loop diagrams and process flow diagrams; and includes non-diagrammatic information, including data sheets.

In a further embodiment, one or more components depicted in the diagrammatic information are linked with data sheets about those components, such that the user can operate the information retrieval system through the user interface to output the data sheet when viewing the diagrammatic information.

In yet another embodiment, the input and the output components include any one or more of: physical (system) inputs and/or outputs, sensors, switches, transmitters, transducers, remote terminal units (RTUs), programmable logic controllers (PLCs), contacts, wires, cables, connections, electrical circuits, electrical components, electro-mechanical components, electronic components, hydraulic components, pneumatic components and actuators.

In yet a further embodiment, the information output means includes either or both a graphic display and a printer.

In another embodiment, the user interface is a graphic display. The user interface may also comprise a user interface of the control system.

In yet another embodiment, the information retrieval system further includes an information input module for inputting the information about input and output components into the information module.

In yet a further embodiment, the information retrieval system further includes a linking information input module for linking the stored information with one or more alarms, and/or for linking the diagrammatic information with data sheet information, and/or for linking the stored information with the status indications.

In an optional embodiment, the information input module and the linking information input module comprises a computer.

In yet another optional embodiment, the control system includes a supervisory control and data acquisition (SCADA) system, a programmable logic controller (PLC) or a de-centralized control system (DCS).

In a further optional embodiment, if the information about an input or output component is a multipage document, the linking with an alarm or a status indication includes information about a page number or page numbers containing the information relevant to the input or output component, such that the information output means outputs only the relevant page or pages.

In another embodiment, one or more input and/or output components associated with an alarm are dynamically highlighted on the retrieved information, and wherein one or more input and/or output components associated with a status indication are dynamically highlighted on the retrieved information.

In a further embodiment, alarm information is displayed on the user interface and the alarm information is hyperlinked such that when activating the hyperlink the stored information about an at least one input and/or output component associated with producing the alarm is output by the information output means.

In yet another embodiment, the control system includes at least one status indication displayed on a control system user interface and the status indication is hyperlinked such that when activating the hyperlink the stored information about the associated input and/or output component is output by the information output means.

In an optional embodiment, the at least one input and/or output component associated with producing an alarm is displayed on the user interface and the at least one input and/or output component is hyperlinked such that when activating the hyperlink the stored information about the at least one input and/or an output component is output by the information output means.

In yet a further embodiment, the one or more components depicted in the diagrammatic information are hyperlinked with data sheets such that when activating the hyperlink the relevant data sheet is or data sheets are displayed.

In an embodiment, the information retrieval system further includes a fault determination module for determining whether an alarm is a false alarm from the information from the input and/or the output components associated with the alarm.

In yet another embodiment, the information module further stores information about the processes and/or equipment.

In an optional embodiment, information about the processes and/or equipment includes diagrammatic information, including one or more of: circuit diagrams, circuit layout diagrams, hydraulic diagrams, pneumatic diagrams, loop diagrams and process flow diagrams; and non-diagrammatic information, including data sheets.

In yet a further embodiment, information about the processes and/or equipment is accessible by the user interface and can be output by the information output means.

BRIEF DESCRIPTION OF THE DRAWINGS

For an understanding of the invention, and to show how it may be performed, optional embodiments thereof will now be described, by way of non-limiting examples only, and with references to the accompanying drawings, in which.

DETAILED DESCRIPTION OF OPTIONAL EMBODIMENTS

The information retrieval system and method of the present invention allows for automation of the following steps in fault identification:

(1) Analysing of the annunciated alarm in order to identify how the alarm is generated and thus which inputs and outputs of the control system are associated with this alarm;

(2) Determining the relevant drawing(s) in hard or soft copy; and, (3) Providing additional information in the form of data sheets for equipment such as sensors and the like, and/or (4) Providing additional information in the form of configuration, program and/or parameter files for equipment such as Variable Frequency Drives, transmitters, transducers and the like.

The information retrieval system and method also allows for limiting or negating the need for specialist knowledge, skills or tools.

Figure 1:
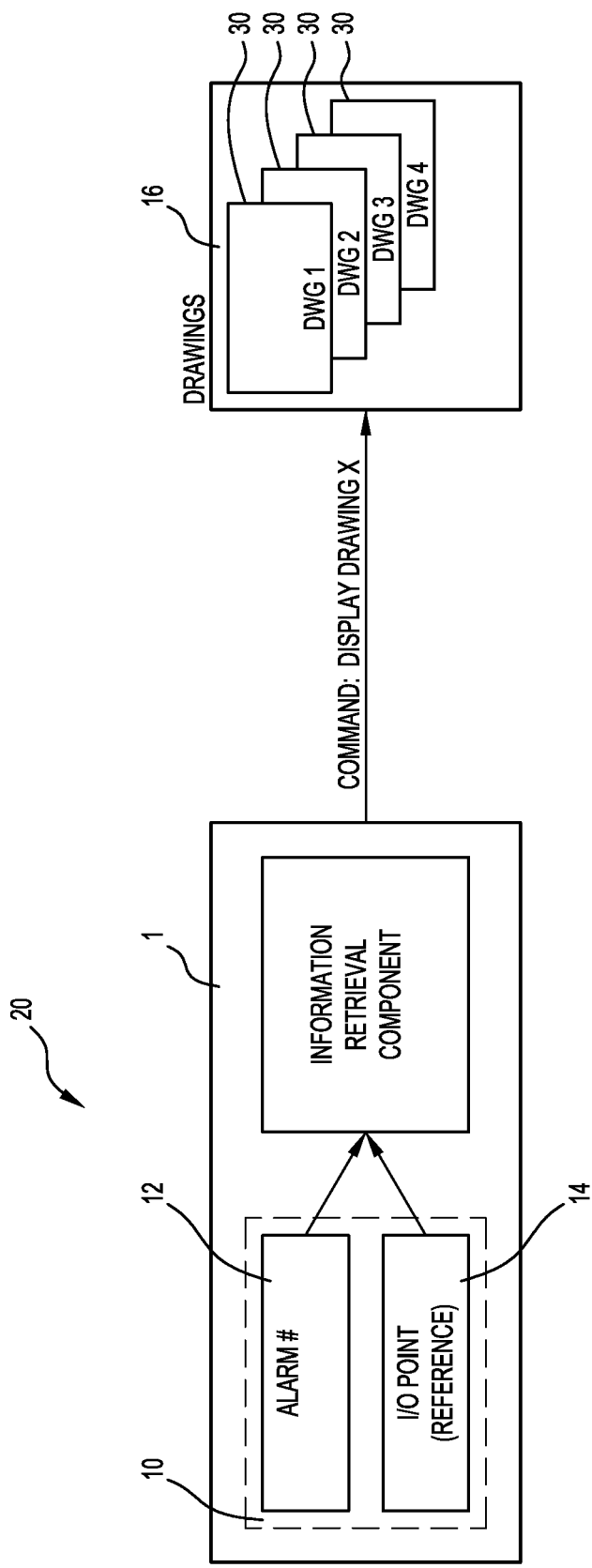
FIG. 1 is a diagrammatic representation of an embodiment of the present invention where the information retrieval system and the control system are integrated.

Referring to FIG. 1, there is shown an embodiment of the information retrieval system 1 which is integrated or incorporated with the control system 10. The control system includes facilities to produce an alarm 12, having alarm information including an alarm number. The control system also includes facilities to produce input and output information associated with each alarm. Further, the control system has facilities to produce status indications (not shown in FIG. 1). Together, the alarms and input and/or output status indications may be referred to as state information, which is displayed by state indications, and which gives an operator feedback about the state of a control system, the plant and processes and/or pieces of equipment in the plant controlled by the control system.

The information retrieval system 1 (also referred to as a component in this integrated 20 system) includes an interface in communication with the control system for receiving information associated with alarms produced by the control system. In the embodiment shown in FIG. 1, the information retrieval system receives alarm number and input output point references.

The operator of the control system will be able to see from the control system user interface, via state indications, that certain equipment and/or processes are in alarm. The control system user interface may display various information about the alarm and associated input components and output components. In one embodiment, the operator is able to click on hyperlinks in the input and output information to operate the information retrieval system user interface to retrieve information from the information module 16. In this embodiment, the information includes various drawings 30 which provide technical information about the input and output components. The technical information is very readily displayed to the operator via an information output means, which may be a visual display monitor, but could also be a printer or both. The technical information is delivered very quickly and is immediately relevant to solving issues with input/output components, equipment and/or processes of concern in the control system.

Particularly, if the state indication from the control system has been triggered not by failure of any equipment or processes, but by a fault in the input/output components, then the information retrieval system enables the operator to identify the relevant components. The information may include diagrammatic information, including one or more of: circuit diagrams, electrical diagrams, circuit layout diagrams, hydraulic diagrams, pneumatic diagrams, loop diagrams and process flow diagrams. Further, the information may include datasheets.

The information retrieval system, in some embodiments, includes hyperlinks that enable the operator to retrieve information relevant to a component wherein the information is both diagrammatic information and associated datasheet information. In another embodiment, the diagrammatic information can be itself dynamically hyperlinked, so that the relevant (and only the relevant) input and/or output components shown in the diagrammatic information are hyperlinked each with its corresponding datasheet.

Figure 2:
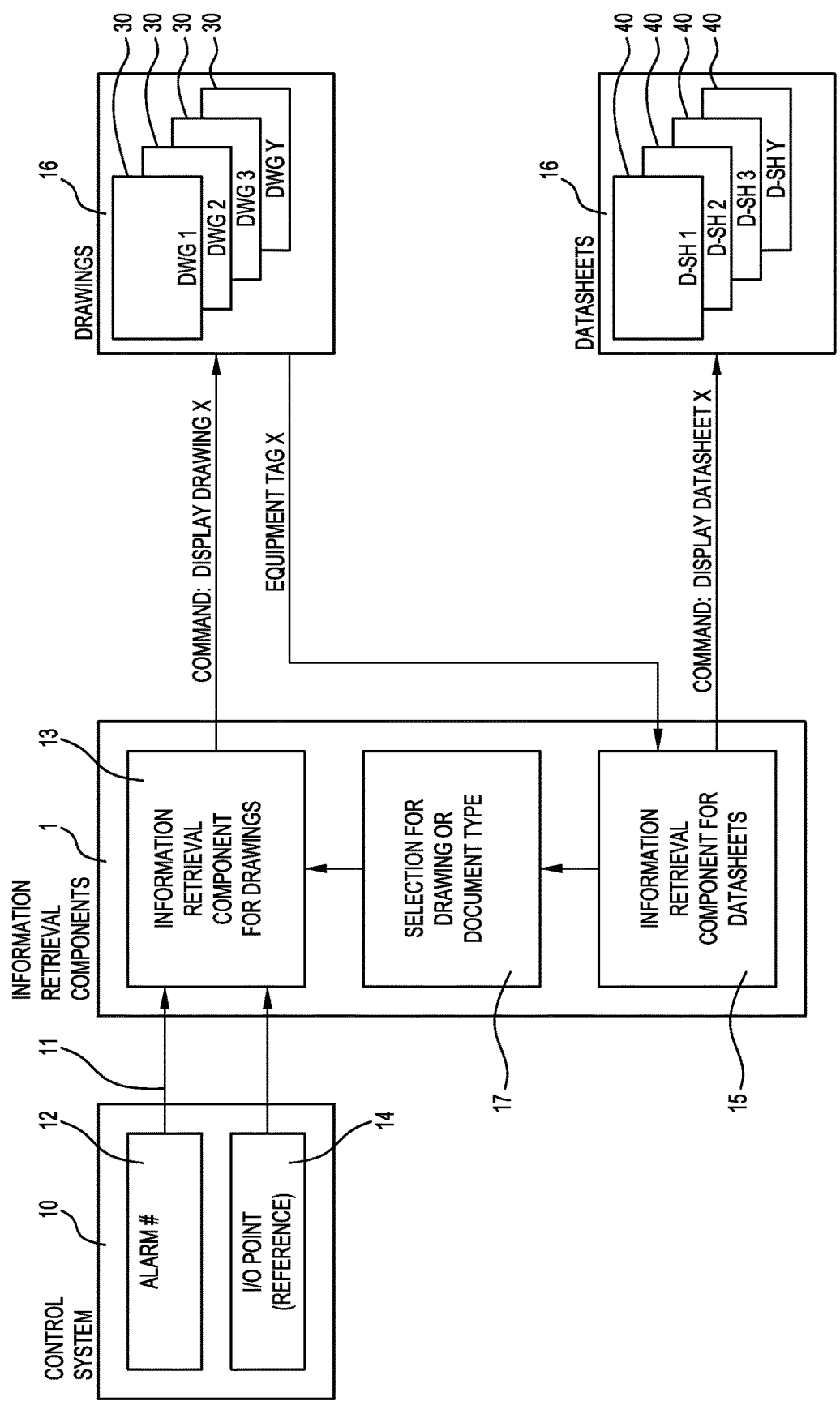
FIG. 2 is a diagrammatic representation of another embodiment of the present invention where the information retrieval system and the control system are separated.

FIG. 2 shows a different embodiment of the information retrieval system from that shown in FIG. 1, wherein the information retrieval system 1 is separate from the control system 10. The information retrieval system and the control system are linked by an interface 11 which is in communication with the control system for receiving information associated with alarms produced by the control system. In the embodiment shown in FIG. 2, the information retrieval system (also referred to as the information retrieval components) includes a number of components, including an information retrieval component for drawings 13 and information retrieval component for data sheets 15. An operator of the information retrieval system 1 can make a selection for a drawing or document type 17 by use of the user interface. It will be understood that the user interface may be implemented as a program on a computer, which displays windows and the like for entering, viewing and controlling actions. Further, the user interface of the information retrieval system and the user interface of the control system can be implemented on the same computer and shown on the same computer screen. Moreover, aspects of a computer program implemented on the user interface of the information retrieval system can be implemented in the same computer program as aspects of such a computer program for operating the control system 10. The aspects of the computer for controlling the information retrieval system may appear in windows or the like which are separate from windows or the like in respect of the control system.

In other embodiments, the information retrieval system 1 includes a cloud-based functionality, so that the retrieval information can be accessed remotely. The cloud based functionality also allows for the information, or part of the information, to be stored remotely from an installation or plant in the cloud. Where the information retrieval system includes cloud-based functionality, there can also be a local component at the installation for providing continued functionality, say, when the internet is unavailable.

The control system 10 will produce alarms or other state indications based on information or data received from input components and/or outputs components which are connected to the control system. The input and output components may include a vast range of different types of sensors, switches, transmitters, transducers, remote terminal units (RTUs), programmable logic controllers (PLCs), contacts, wires, cables, connections, electrical circuits, electrical components, electro-mechanical components, electronic components, hydraulic components, pneumatic components and actuators. The input and output components may also include physical (system) inputs and/or outputs. Typically, the input and/or output components are connected to the control system 10 by cables or wires.

The alarms produced by the control system 10 include true alarms, if a condition is satisfied in the processes and/or equipment, wherein, for example, a piece of equipment or a process is not functioning in an expected or acceptable manner such that the input and/or output components associated with the equipment or process will send data to the control system indicating the abnormal state of the process or equipment. This may be regarded as normal functioning of the control system 10, which enables an operator to make adjustments or repairs to the processes or equipment. Sometimes the adjustments or repairs can be made via the control system. Other times the adjustments or repairs must be made to the equipment or processes themselves.

In other circumstances, it can happen that equipment and/or processes in a factory or plant may operate within normal and expected parameters, but the input and/or output components themselves are faulty causing data to be sent to the control system 10, which causes the control system to produce a false alarm. It is such false alarms that can be very difficult to detect and fix, especially where there may be a very large number of input and/or output components connected to a control system.

For example, it may be that an input sensor is malfunctioning causing an incorrect temperature reading to appear on the control system, which in turn causes the control system to produce an alarm showing that temperature in a piece of equipment or in a process is outside of acceptable parameters. This false alarm may cause the operator to believe that the process or equipment itself is malfunctioning. However, upon investigation the operator may discover that in fact the process or equipment is not malfunctioning, and then the operator may suspect that the inputs and/or outputs are faulty. In such circumstances, the operator will be able to use the information retrieval system 1 to obtain drawings 30 which are stored in the information module 16. The drawings may include diagrammatic information, including circuit diagrams, electrical diagrams, circuit layout diagrams, hydraulic diagrams, pneumatic diagrams, loop diagrams and process flow diagrams.

In other situations, the operator may want to inspect data sheets 40, which are also stored on the information module

16. In FIG. 2, the drawings 30 and data sheets 40 are shown in separate information modules. However, it will be understood that the drawings and data sheets can be stored on the same information module.

In various embodiments, the information retrieval system 1 will allow the operator to click on hyperlinks which appear on the control system 10 screen. The hyperlinks may appear next to or may be the data items (state indications) appearing on the control system screen. For example, the control system screen may display an alarm and also display the inputs and/or outputs associated with the alarm. The inputs and/or outputs may be hyperlinked such that, when the operator clicks a hyperlink, the information retrieval system receives through its interface in communication with the control system information associated with the alarm. The information retrieval system 1 is enabled to retrieve information from the information module based on links between the input and/or output component and the drawings 30 or data sheets 40.

In a more specific example, the operator may click on a link for a particular input/output component. The component has an identifier (sometimes referred to as an index), and the identifier is received via the interfacing communication with the control system by the information retrieval system. The component identifier is linked with information in the information module 16. The information may be a circuit layout diagram, which is retrieved and displayed on the user interface of the information retrieval system.

One important feature of the present invention is the ability to segment data input into the information retrieval system. Typically, this information would be input when the information retrieval system is being set up, perhaps along with setting up the control system and also possibly when setting up any or all of the rest of a plant. Segmenting refers to breaking up relatively large pieces of information into smaller pieces of information, each of which is relevant and can be associated with a particular input and/or output component, process, piece of equipment or the like by linking that segmented information with the associated item. In one example, the stored information may be a large diagram, but only a small part of the diagram is relevant to the part of the plant producing an alarm or other state indication. In one embodiment, segmenting will be information entered into the system so that only the relevant or most relevant part of the diagram is retrieved by the information retrieval system, and can be displayed to an operator. This has a significant advantage that the operator will not be confused and/or overwhelmed by excessive and irrelevant data or information concerning an issue that the operator is trying to address.

It will be understood that the segmenting can be implemented as required or specified during set up of the information retrieval system or the plant as a whole. Generally, the more that information is segmented so as to be immediately relevant, the greater the efficiency of the information retrieval system, as it will deliver only that information which is relevant or most relevant to an issue. For example, a single document (which may be a multipage document or simply a very large document) may have a large number of diagrams (say, circuit diagrams), and segmenting could be implemented to break the information from that document into multiple single circuit diagrams. Alternatively, segmenting could be implemented to show finer levels of detail by breaking down a single circuit diagram into various component parts, and wherein each component part of a single diagram is linked with a particular part of the plant. Perhaps an entire circuit diagram shows the conceptual layout of circuits for inputs and/or outputs associated with a particular piece of equipment in the plant. However, only a small part of the whole circuit diagram is relevant to a given input. In such circumstances, it is possible to segment the information so that only that part of the diagram relevant to that given input is linked with that input in the information retrieval system. When a state indication relating to that input appears in the control system interface, the operator can operate the information retrieval system to retrieve only that part of the circuit diagram because it has been segmented and linked with that input.

In another embodiment, each component has a unique identifier, which can be used in the information retrieval system for associating that component with the relevant stored information. It will be understood that any item within a plant can have such a unique identifier such that it can be linked with a relevant piece of information, which has been segmented from a larger document or larger piece of information.

It may be that the diagrammatic information or document stored in the information module is a multi-page document. In this case, the linking of the input component identification and the information stored in the information module can be further specified such that only certain pages of the multi-page document are displayed on the user interface of the information retrieval system. Further, the linking can be specified such that the information retrieval system user interface displays only a part of a page in a document. This will be useful where the page contains a complex circuit diagram with many input and output components showing on the page. Such direct linking between the input and/or output components and the information about the input and/or output components in the information module can save much time when trying to locate a fault causing a false alarm. The linking to select parts of a large or multi-page document comprises one example of segmenting the information so as to have relevant or most relevant information provided to an operator by the information retrieval system.

In another embodiment, the information retrieval system 1 is enabled to receive information associated with status indications produced by the control system 10. Such status indications may include, for example, loading information for processes and/or equipment in a factory or plant. In another example, the status indication may relate to a pull cord switch, and indicates whether it is healthy or tripped (see FIG. 4D for an illustrated example of this). The status indications may be derived from process conditions or actual input, or output components, for example, "Emergency Stop" or "Limit Switch". An operator of the control system can see the status indication information on a computer screen of the control system, where, if the status indication shows, for example, "tripped", then the operator can click on a hyperlink which may be next to the "tripped" indicator. The hyperlink sends a command through the interface of the information retrieval system which is in communication with the control system, such that the information retrieval system is able to retrieve information from the information module associated with the status indication. The status indication may be linked with a number of documents of diagrammatic information and may also be linked with a number of data sheets. The information retrieval system uses the links to retrieve the information from the information module and output the information through the user interface so that the operator can readily ascertain directly relevant information associated with the status indication.

The information retrieval system 1 includes information output means. The information output means may comprise the user interface of the information retrieval system, however, the information output means may also include physical output means such as a printer. In an embodiment, an operator can select whether the information is displayed on the user interface or is printed from the printer. Of course, the operator may select both information output means. Printed information can be useful for an operator when he or she needs to leave the immediate vicinity of the user interface of the information retrieval system 1 and the control system 10 so as to attend to inspecting equipment or processes in a factory or plant, or to inspect input and/or output components associated with that equipment or the processes.

In yet another embodiment, information from the information retrieval system can be output to a mobile computing device, such as a laptop computer or even a mobile phone. This enables an operator to freely move around a factory or a plant and have the relevant information at hand. This can be particularly useful where a factory or plant is extremely large, such as oil refineries, mining facilities or large factories.

The information module 16 of the information retrieval system 1 may also contain information regarding processes and/or equipment for the factory or plant. This provides an additional benefit in that an operator can readily access such information, along with the specific information regarding input and/or output components connected to the control system 10.

Figure 3:
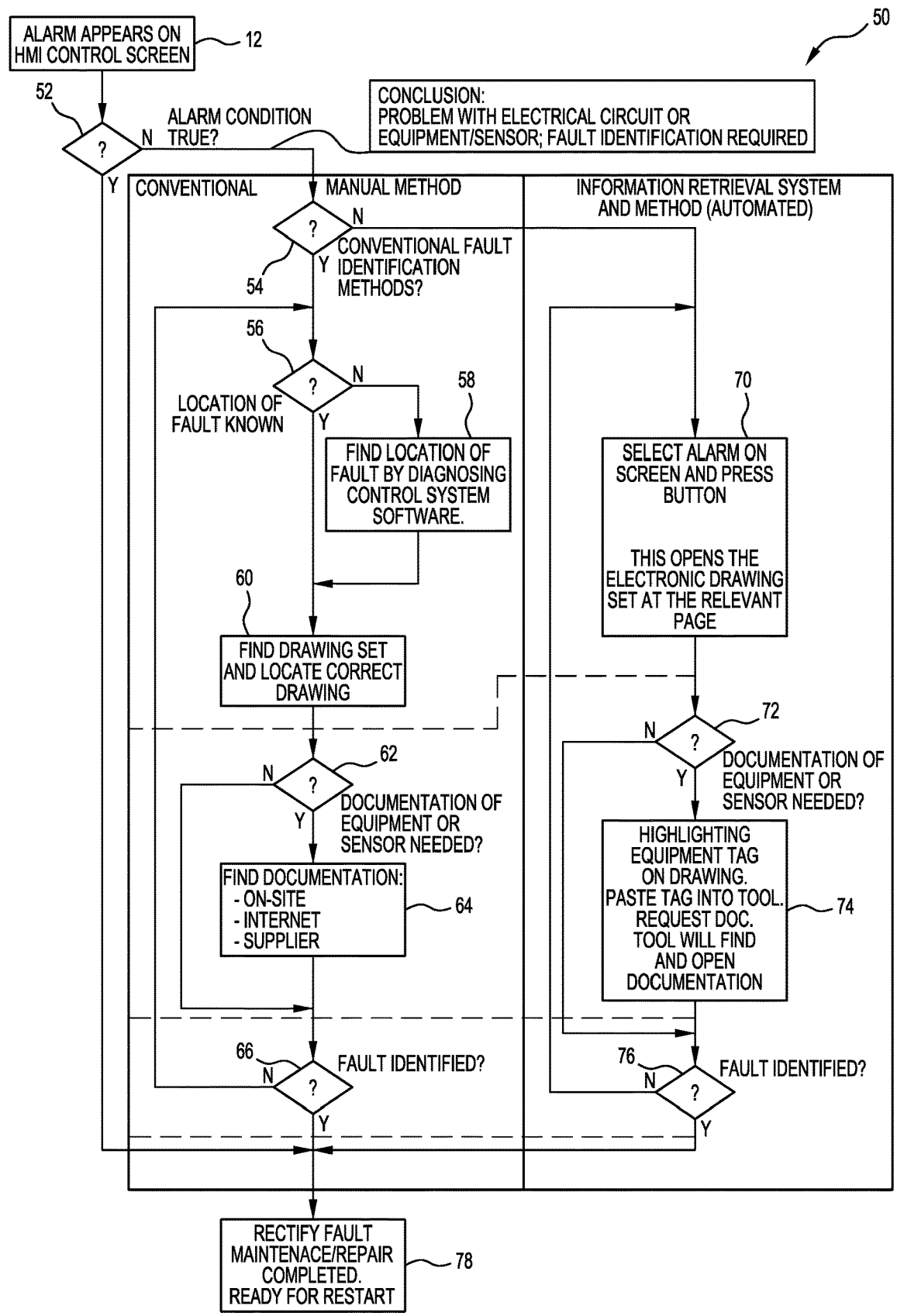
FIG. 3 is a flow diagram showing typical method steps in an embodiment of the present invention.

FIG. 3 is a flow diagram 50 showing example processes for operating a control system 10 with an embodiment of the information retrieval system 1. In the example process an alarm 12 appears on the control system screen. At a first decision point 52, it is determined by the operator or the system whether the alarm condition is true (a true alarm) or false. If true, then normal procedures are followed and the operator works to rectify the fault, conduct maintenance and/or repair of the equipment or processes 78.

In FIG. 3, if the alarm condition is not true (a false alarm), then the conclusion is that the problem lies with input and/or output components, electrical circuits or equipment/sensors, wherein the fault identification is required. FIG. 3 shows a comparison of conventional methods having conventional decision points 54, 56, 58, 60, 62, 64 and 66, leading to rectification, maintenance or repair of the fault 78. This is a very heavily manual method of fixing problems, often requiring many hours of looking through large amounts of unsorted, unindexed information to find the relevant information or document to fixing a problem. Even if the information is stored electronically, many hours can be wasted identifying the correct document for the problem at hand. FIG. 3 also shows a process of reaching point 78 through use of the information retrieval system 1 through process points 70, 72, 74 and 76. The flow diagram 50 of FIG. 3 is intended to demonstrate that the conventional processes of fault identification are more complex and slower than the method of fault identification using the information retrieval system 1. The information retrieval system automates the retrieval of the correct documentation by linking that information with the problem giving rise to, for example, an alarm. This means an operator has near immediate access to the required information without the need to manually sift through many pages of documentation and through large diagrams.

In the conventional method, if a false alarm is produced by the control system 10, then it is determined whether the location of the fault is known 56, if so, then an operator may find a drawing set and locate the correct drawing. If the location of the fault is not known then the operator will have to find the location of the fault by diagnosing control systems 10 software 58. This conventional method can take a large amount of time as the drawings and/or data sheets may be difficult to locate, badly indexed, badly catalogued or missing. By using segmenting and linking of the present invention, the relevant or most relevant information associated with a state indication is retrieved and can be displayed to an operator. When the correct information is found at point 60, it is determined whether the documentation of equipment or sensor is needed at point 62. This documentation may be found on-site, via the internet or through suppliers of the equipment or sensors 64. Again, locating this documentation can be very time consuming, especially if the documentation is not on-site. When the documentation is located or if the documentation is not required, then the operator (or associated experts) will determine whether the fault has been identified at point 66, then the appropriate personnel can attend to rectifying the fault or maintenance and/or repair as needed 78.

In comparison, the information retrieval system 1 provides a much simpler process wherein the operator can, for example, select an alarm on the screen and press a button 70, which opens an electronic drawing set at the relevant page. It can then be determined 72 whether documentation of equipment or sensor is needed. If so, the operator can click a hyperlink on the electronic drawing to retrieve documentation off the equipment or sensor in, for example, a data sheet. The data sheet will then display on the information output means. The operator or associated expert personnel can then determine if the fault has been identified 76, and then proceed to rectify the fault, maintain and/or repair as needed 78.

Figure 4:
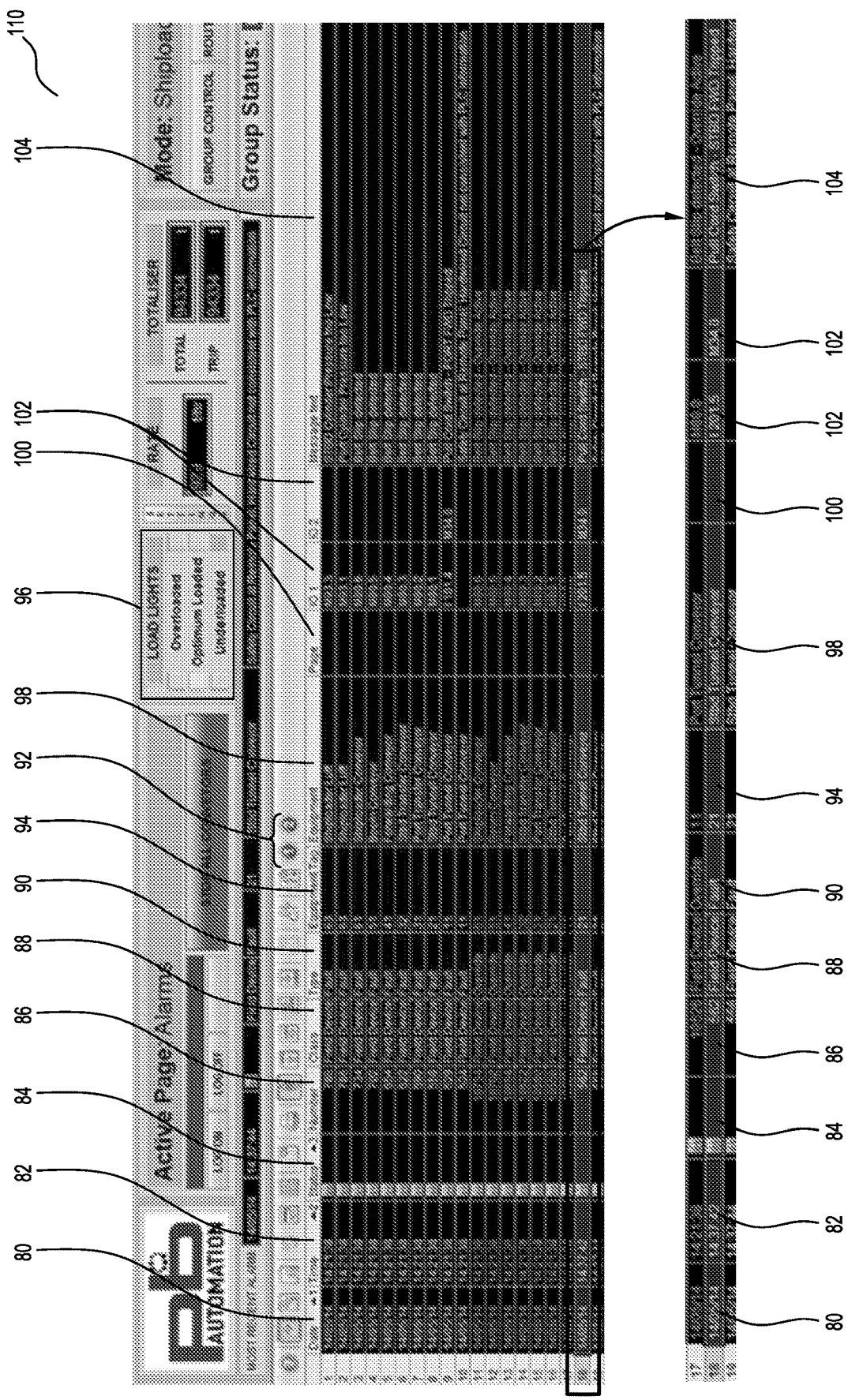
FIG. 4 is a diagrammatic representation of an example screen shot showing information displayed in a possible scenario in accordance with an embodiment of the present invention.

FIG. 4 is a diagrammatic representation showing an example screenshot from a user interface of the information retrieval system 1/control system 10. The window display shows information associated with a number of different alarms 12. Each alarm is displayed in a numbered row in the window, with data associated with the alarm displayed in the columns. The columns include: date 80, time 82, status 84, number 86, class 88, type 90, equipment tag 94, equipment 98, page 100, inputs and/or outputs 1 and 2 102, and message text 104. A part of the window 110 is circled and magnified for clarity. The circled part is alarm in row 18, which, in this example, has the flowing data associated with the alarm: date 80 is "14 May 2014", the time 82 is approximately 2:37 p.m., the alarm number 86 is "562", the class 88 is "Field Device", the alarm type 90 is "Fault", the equipment tag 94 is "21", the equipment 98 is "STBD Tunnel Conveyer", in this example, the page 100 is not displayed, input/output 1 102 is "1201.5", input/output 2 102 is "M34.0", and the message text 104 is "pull cord switch . . . ".

The control system/information retrieval system window 110 also shows buttons 92 related to input/output 1 and input/output 2 102, such that when an operator selects a row associated with an alarm or another kind of state indication, the buttons 92 can be clicked. If button 92 numbered as "1" is clicked, then the information retrieval system will obtain information related to input/output 1 associated with the selected alarm.

Also shown in the window for the control system 10/information retrieval system 1 is the status indication panel 96, which, in this example, shows load status indications, including overloaded, optimum loaded and unloaded. The status indication 96 may also be hyperlinked so that when the operator clicks that area of the window 110, the information retrieval system 1 will deliver relevant information to the particular status indication.

Figure 4A:
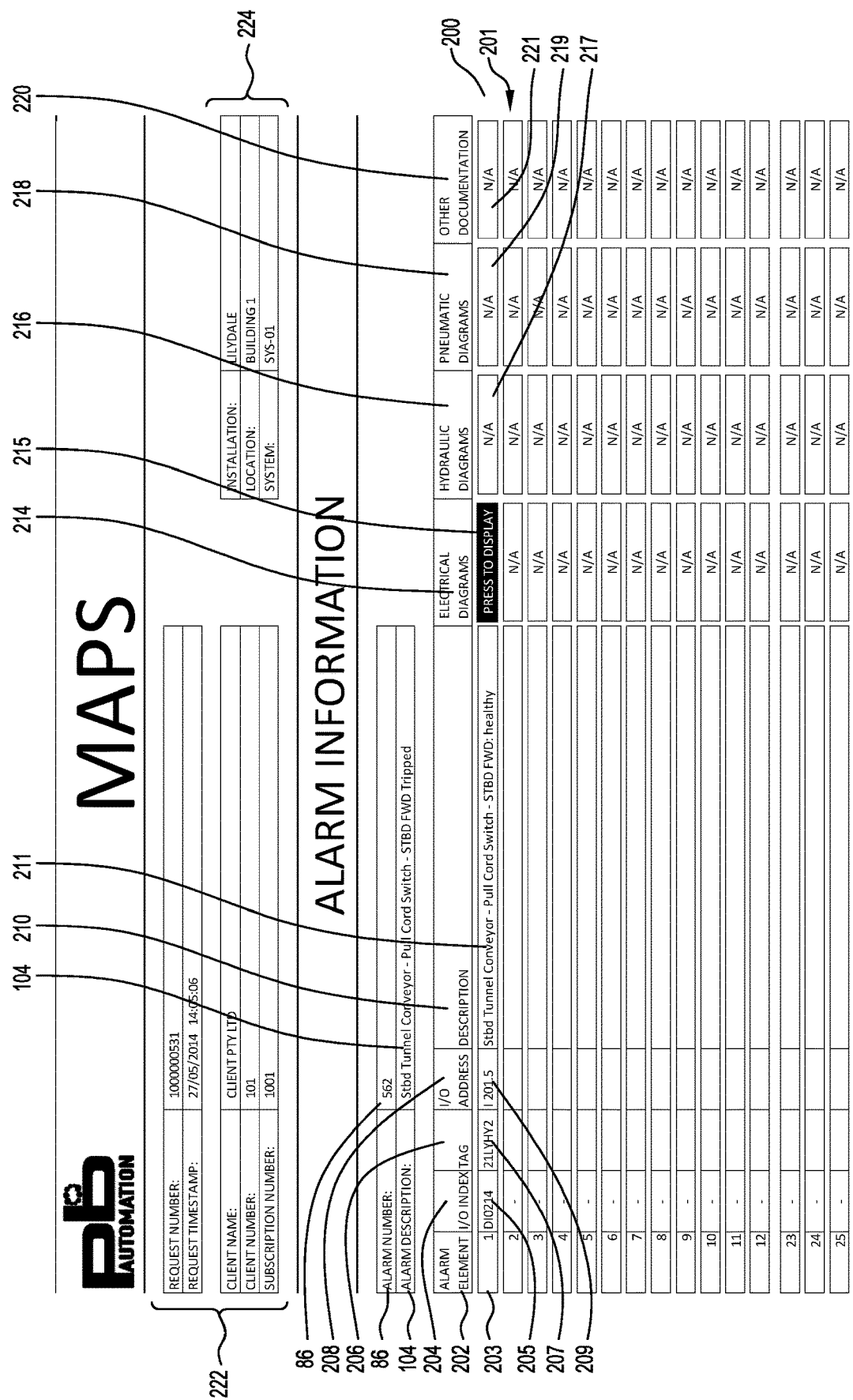
FIG. 4A is a diagrammatic representation of an example screen shot showing information displayed in a possible scenario in accordance with an embodiment of the present invention.

In reference to FIG. 4, and in a different embodiment, instead of there being two buttons 92 related to input/output 1 and input/output 2 102, there is a single button, which, when pressed, opens a new window 200 as shown in FIG. 4A. This window, view or screen 200 shows information relevant to an alarm, which is highlighted in FIG. 4 from row 18 of the Table in that screen 110. In screen 200 from FIG. 4A, there is shown the alarm number, which is "562" shown towards the top of the Table 86, along with the alarm description 104 "Stbd Tunnel Conveyor—Pull Cord Switch—STBD FWD TRIPPED". The main table in stream 200 display information about the alarm, and in this example has only one entry in the top row 201. The main table displays information associated with the alarm including the "ALARM ELEMENT" 202, which is "1" 203; the "I/O INDEX" 204, which is "DI0214" 205; the "TAG" 206, which is "21LYHY2" 207; the "I/O ADDRESS" 208, which is "I 201.5" 209; and, the "DESCRIPTION" 210, which is "Stbd Tunnel Conveyor—Pull Cord Switch— STBD FWD: healthy" 211. The main table then displays the available information for the information retrieval system 1, which in this example includes "ELECTRIAL DIAGRAMS" 214, "HYDRAULIC DIAGRAMS" 216, "PNEUMATIC DIAGRAMS" 218, and "OTHER DOCUMENTATION" 220. Where such information is available in the information retrieval system, there will be a button displayed underneath. In this example, only the electrical diagrams 214 are available, and so there is a "PRESS TO DISPLAY" button 215 shown underneath. Where such information is not available, the Table simply displays a "N/A" 217, 219, 221 to show that such information is not available.

The screen also displays information for context of the alarm towards the top of the screen in areas 222 and 224.

Figure 4B:
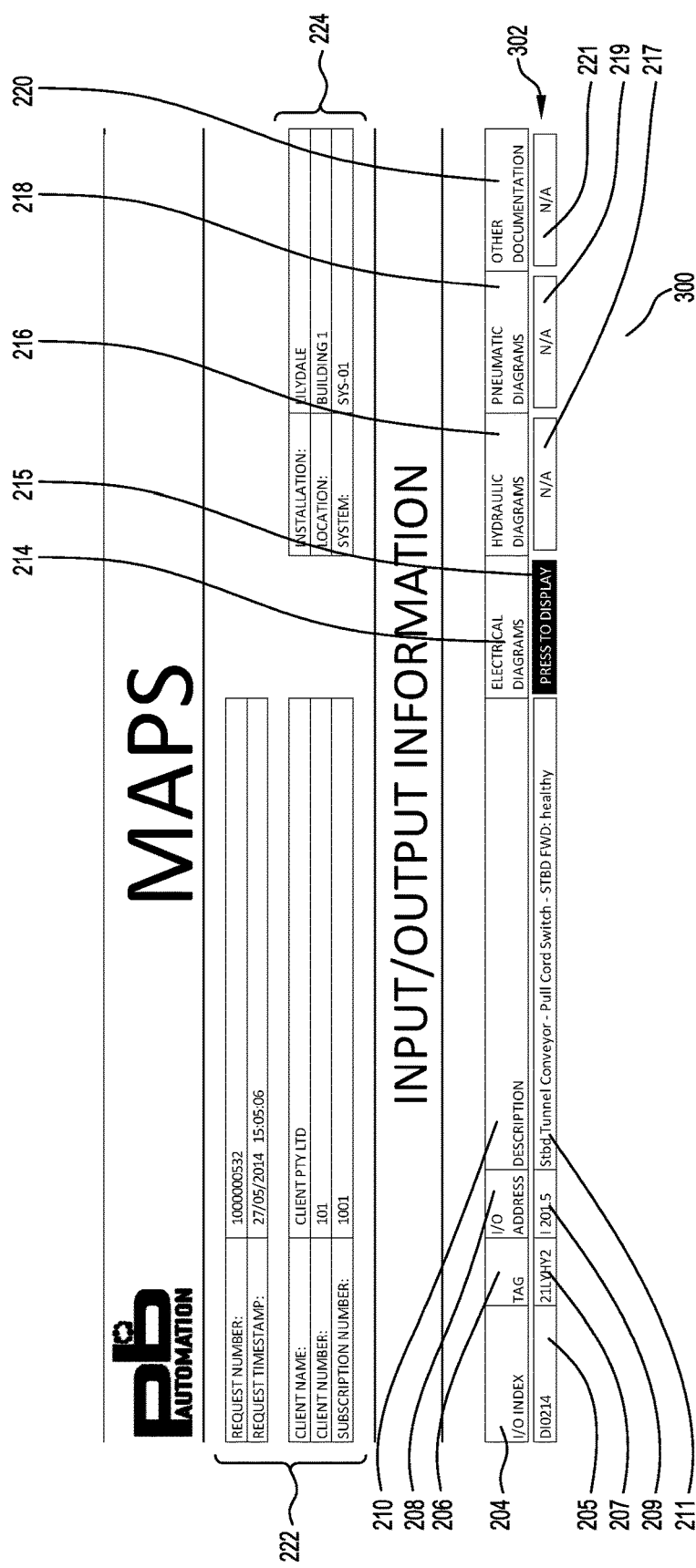
FIG. 4B is a diagrammatic representation of an example screen shot showing information displayed in a possible scenario in accordance with an embodiment of the present invention.
Figure 4C:
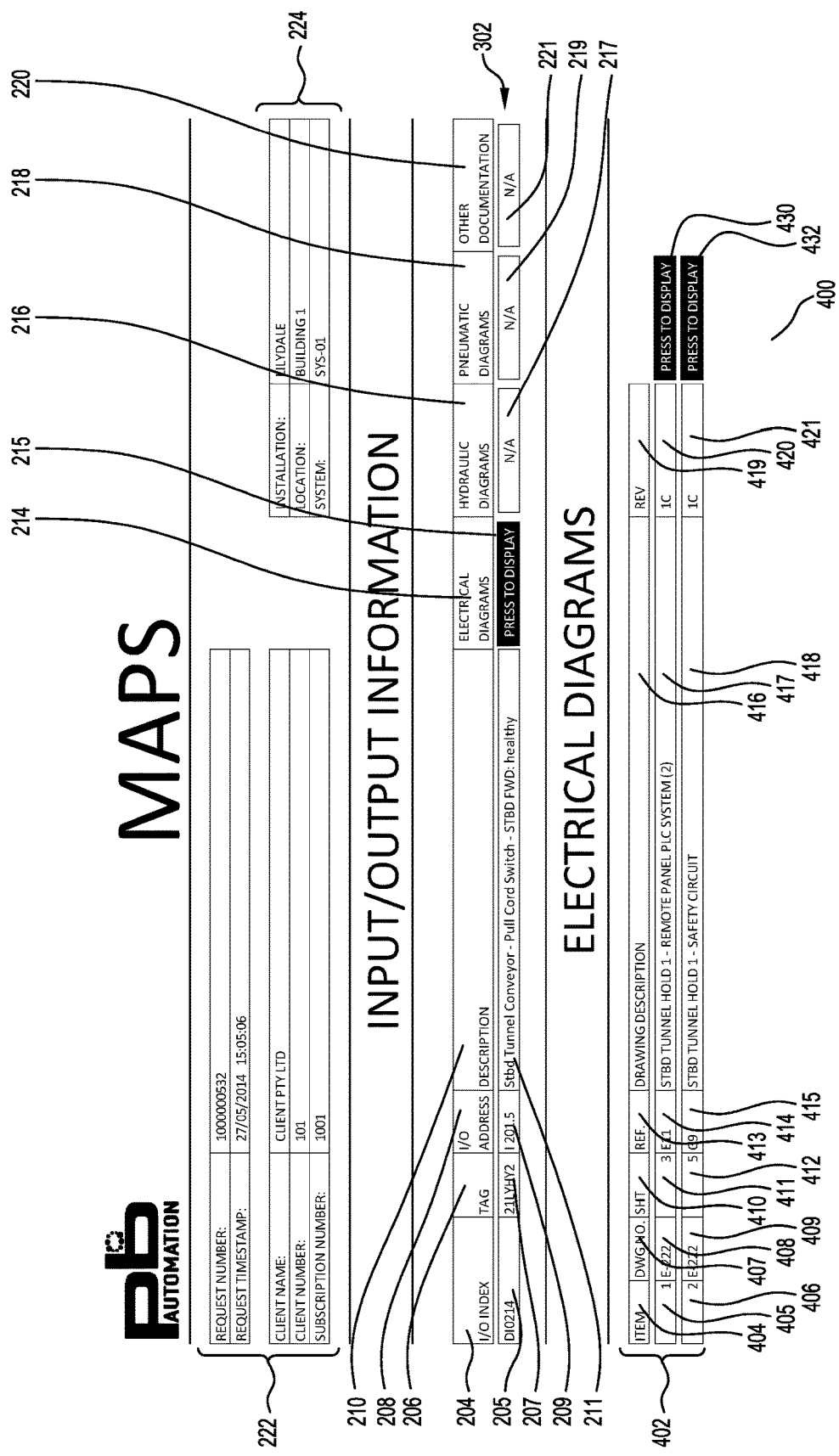
FIG. 4C is a diagrammatic representation of an example screen shot showing information displayed in a possible scenario in accordance with an embodiment of the present invention.

If the operator wishes to see relevant information to the alarm, then he/she can activate the "PRESS TO DISPLAY" button 215, which will cause screen, window or view 300 to display as shown in FIG. 4B. This screen displays row 302, which is summary information related to "ALARM ELEMENT" 202, being number "1" 203 and shows information in regard to the inputs and/or outputs associated with the alarm. In this example, the information is related to the pull cord switch input. The operator can activate the "PRESS TO DISPLAY" button 215, which then causes window, screen or view 400 to display as shown in FIG. 4C, which has a Table 402 itemizing information identify all available "ELECTRICAL DIAGRAMS" 214. Table 402 include columns showing the "ITEM" 404, which, in this example, include items "1" 405 and "2" 406; the "DWG NO." 407, being the drawing numbers "E-222" 408 and "E-222" 409; the sheet number "SHT" 410, being "3" 411 and "5" 412; and, the reference "REF." 413, being "E11" 414 and "G9" 415. The Table 402 also shows the "DRAWING DESCRIPTION" 416, being "STBD TUNNEL HOLD 1—REMOTE PANEL PLC SYSTEM (2)" 417 and "STBD TUNNEL HOLD 1—SAFETY CIRCUIT" 418, along with the revision "REV" 419, for each electrical diagram being "1C" 420, 421.

The Table 402 in screen 400 also has "PRESS TO DISPLAY" buttons 430, 432, which when activated by the operator will display the particular electrical diagrams linked by the information retrieval system 1 to the alarm 86 and the associated input of the pull cord switch. It will be appreciated that, with the press of a few buttons on a computer screen the immediately relevant information is available to the operator, which will have been segmented and linked to this particular alarm number "562", and any associated inputs and/or outputs, so as to be immediately relevant to that alarm. There will be a great saving in time compared with the previous manual method of sifting through large amounts of documentation to try to locate the relevant information to an alarm.

Figure 4D:
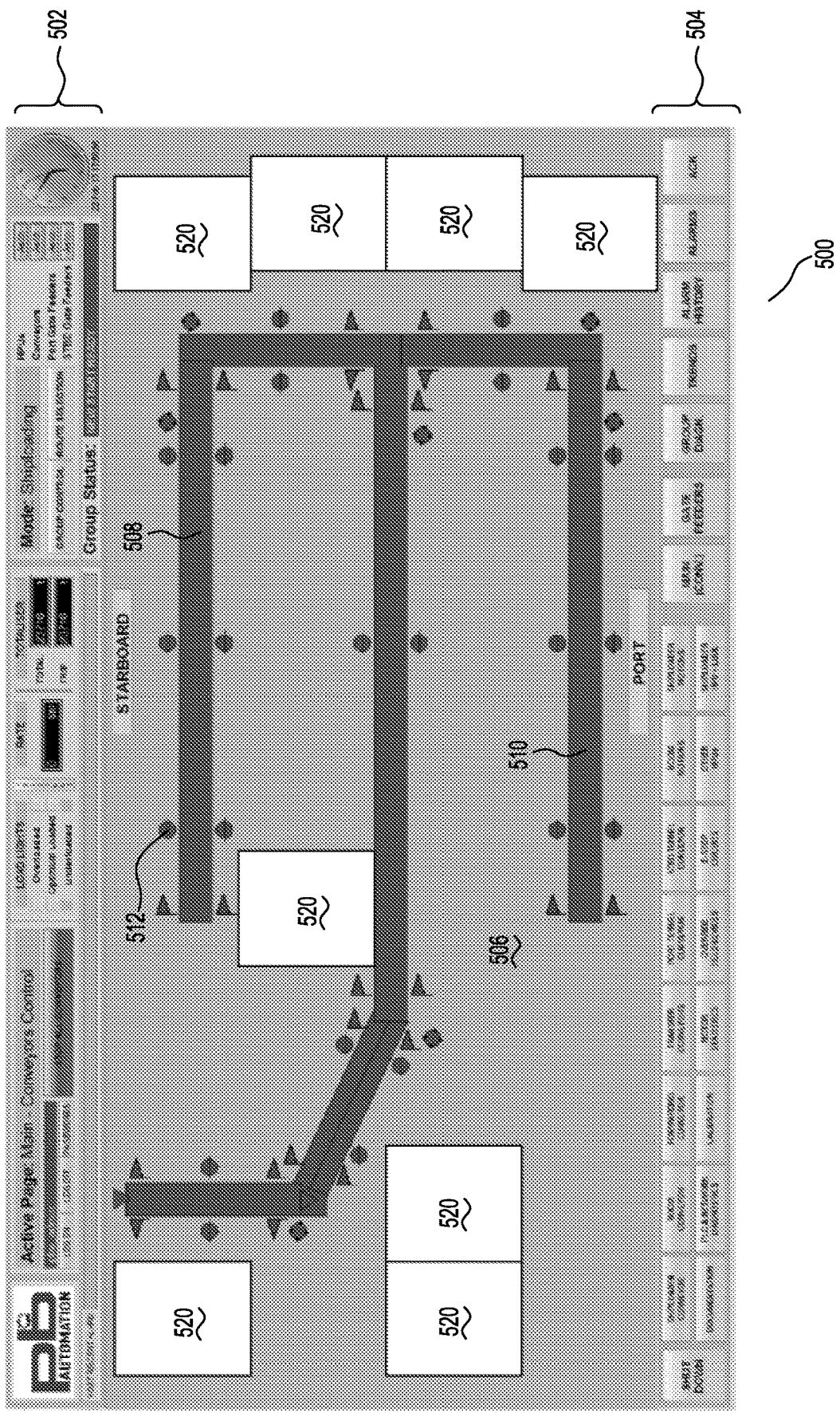
FIG. 4D is a diagrammatic representation of an example screen shot showing information displayed on an example control system screen.

FIG. 4D shows an example screen 500 in a control system 10. Sometimes an operator will want to know information about a particular item or component in a plant, even if there is no alarm from the control system related to that component. For example, the operator may be interested in information related to pull cord switch 512 on the Stbd Conveyor Belt 508, as shown in the diagram for the conveyors 506, which also includes depiction of port conveyor 510.

The control system 10 display screen 500 also includes information at the top 502 and bottom 504 of the screen, along with boxes 520 showing information about the conveyor system 506 as a whole, or information about individual components of the system.

If the operator wants information about pull cord switch 512, then he/she can activate a hyperlink or button display on or with the depiction of the pull cord switch 512 on the screen 500. Activating that hyperlink or button will display the screen 400 as shown in FIG. 4C, where the operator can activate the "PRESS TO DISPLAY" buttons 430, or 432, to display "ELECTRICAL DIAGRAMS" 214 related to the pull cord switch 512. In this regard, it will be understood that it is not necessary for there to be an alarm to retrieve information about components in a system or a plant, and the operator may merely be interested in retrieving such information for other purposes. This will have the advantage that the information retrieval system 1 has the information segmented and linked to the component of interest (in this example, pull cord switch 512). In another embodiment, when the operator activates the pull cord switch hyperlink or button, the information retrieval system 1 will display a screen 300 as shown in FIG. 4B. The operator can then use the button 215 on screen 300 to get to screen 400 as shown in FIG. 4C, and then use the buttons on that screen 430, 432 to retrieve the relevant diagrams.

Figure 5:
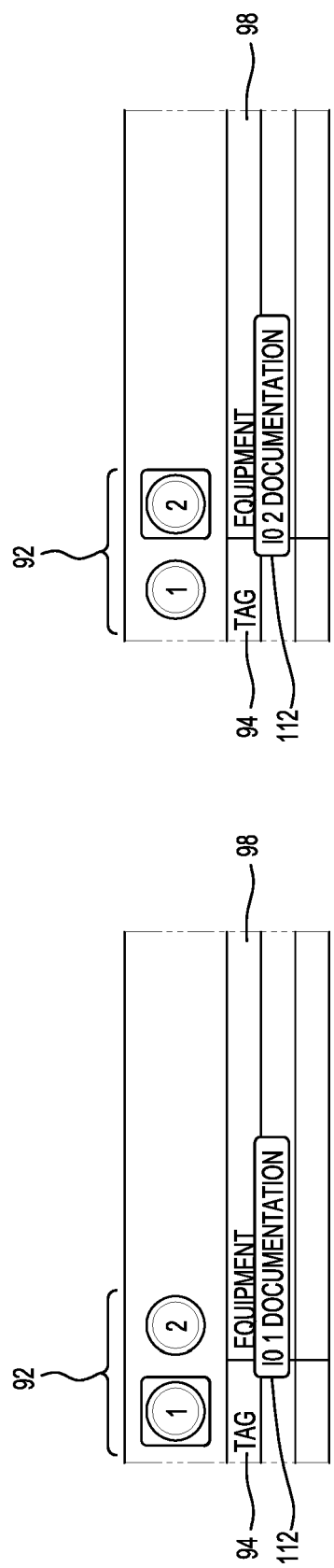
FIG. 5 is a detail of the screen shot from FIG. 4 buttons that provide links to other information.

FIG. 5 shows a detail of window 110. In the left-most panel of FIG. 5, button 92 "1" has been selected which causes a tool tip 112 to appear on the screen. In the example, row 18 has been highlighted by the operator, related to alarm number 86 "562". The operator then clicks button 92 "1" to retrieve information regarding input/output 1 102 "I201.5". The information regarding input/output "1201.5" may include circuit diagrams, component diagrams and the like. The information may also include data sheets. The relevant information will be immediately displayed to the operator via the information output means of the information retrieval system 1.

Alternatively, as shown in FIG. 5, the operator may select button 92 "2" to bring up documentation regarding input/output to 102.

Figure 6:
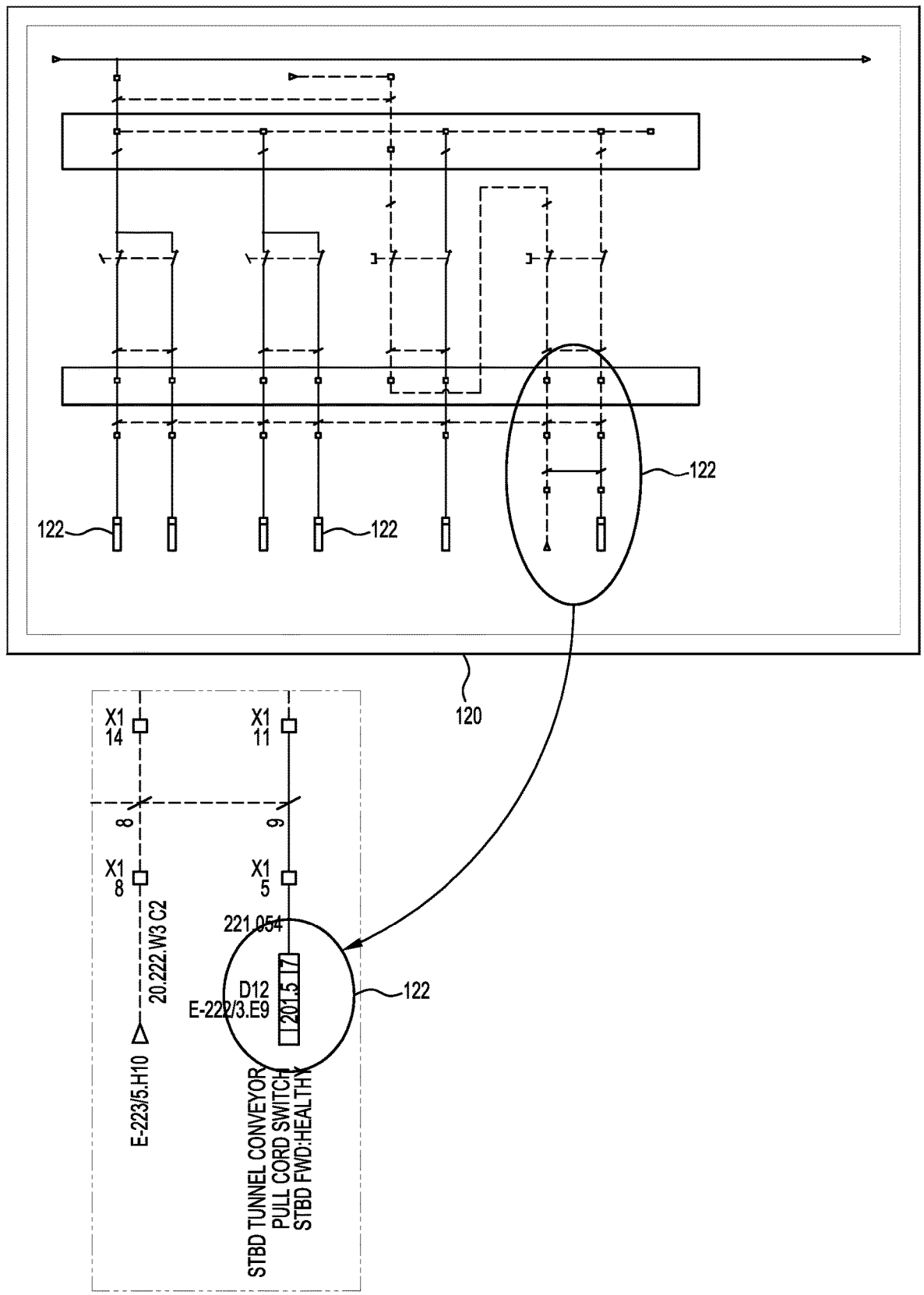
FIG. 6 is an example of documentation that is provided by the information retrieval system and method, also showing a detail (circled) of the document.

FIG. 6 shows example information that can be retrieved and displayed by the information retrieval system 1. In this example, the information is a drawing (circuit diagram) 120. The drawing includes information about various input/output components 122. The input/output component of interest 122, that is "I201.5" is circled and displayed in detail.

In an embodiment, the part of the drawing 120 related to the input/output component of interest 122 may be dynamically hyperlinked, such that the operator can click that hyperlink and bring up data sheets and other information related to the input/output component of interest.

Figure 7:
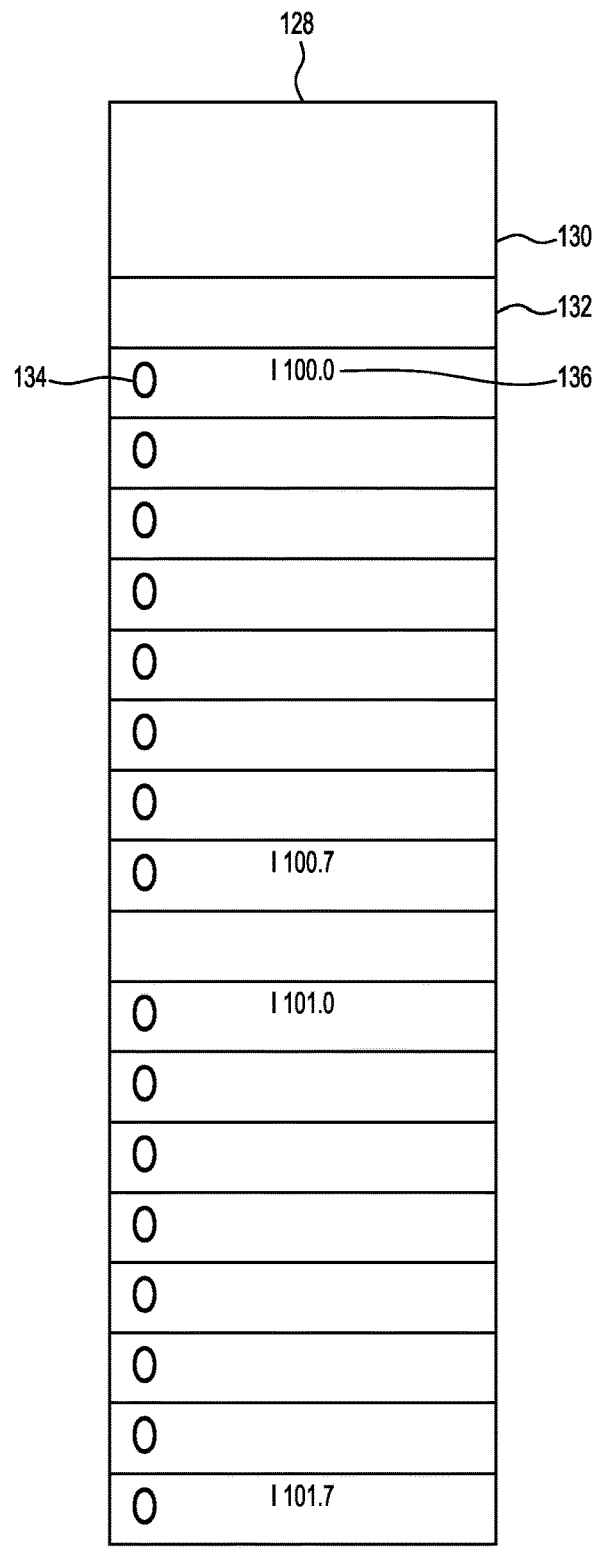
FIG. 7 is a diagrammatic representation of a picture window displaying a status screen for digital inputs/outputs; and, FIG. 8 is a diagrammatic representation of a picture window displaying a status screen for analogue inputs/outputs, different from that in FIG. 7.
Figure 8:
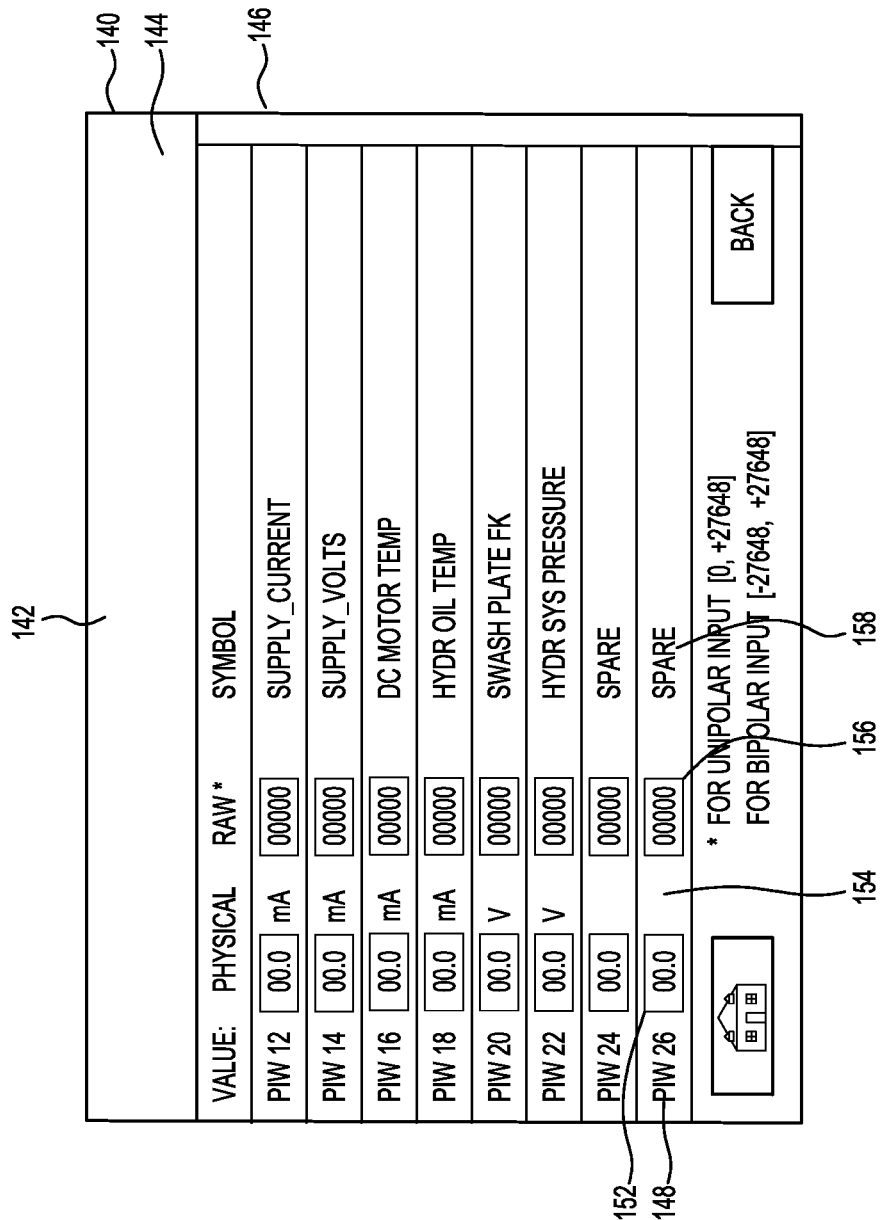

FIG. 7 shows an example screen display of a digital input/output status indication 128. The status indication includes a text box 130 having a descriptive card. FIG. 7 shows an example status indicator 134 with associated address 136 (in this example "I100.0"). Clicking on the status indicator will cause the information retrieval system 1 to open up an electrical drawing where the input/output is shown FIG. 8 shows an analogue input/output status indication 140. This status indication has a text box 142 with a descriptive card.

The analogue channel information 146 is displayed in rows, and clicking on the channel information will enable the information retrieval system 1 to open, for example, a relevant electrical drawing where the channel is shown.

The columns in the analogue channel information 146 include channel address 148, channel type 150, physical value of connected signal 152, unit for physical value 154, raw value 156 and channel description 158.

The information retrieval system 1 may also include an information input module for inputting the information about, for example, input and output components into the information module. The information input module may include a scanner, which can be used to scan in electrical drawings, component drawings and the like, or can scan in data sheets associated with a particular input or output component.

The information retrieval system 1 may also include a linking information input module. The linking information input module is used for linking stored information with one or more alarms, and/or for linking the diagrammatic information with data sheet information, and/or for linking the stored information with the status indications. It is the linking information that is used by the information retrieval system to enable an operator to click on, for example, hyperlinks on the screen of the control system 10 to cause the information retrieval system to retrieve relevant information related to an alarm or a status indication.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. An information retrieval system for use with a control system in a plant having processes and/or pieces of equipment, the control system connected with at least one input component and/or at least one output component monitoring and controlling the processes and the pieces of equipment, the control system enabled to produce state indications from one or more of: the at least one input component and/or the at least one output component; at least one of the processes; at least one of the pieces of equipment; a part of the control system; or, a part of the plant, the information retrieval system comprising:
a computer system;
an interface in communication with the control system and receiving the state indications; and
a user interface controlling the information retrieval system;
wherein the information retrieval system:
stores information about the at least one input component, the at least one output component, the processes, the pieces of equipment and the plant, wherein the stored information is linked with the state indications, and wherein the stored information is segmented so that the information linked with a given state indication is relevant to one or more of: the at least one input component and/or the at least one output component; the processes; the pieces of equipment; the part of the control system or the part of the plant associated with the given state indication; and
selectively segments stored information and selectively links the segmented stored information with one or more of the state indications;
such that, a user can operate the user interface to retrieve the selectively segmented and linked stored information for a received state indication;
wherein, if the stored information is a multipage document, the segmenting and linking further includes inputting one or more page numbers containing information relevant to the received state indication, such that the selectively segmented and linked stored information retrieved includes only that page or those pages.

2. An information retrieval system according to claim 1, wherein the segmenting and linking further includes inputting information such that at least one part of the selectively segmented and linked stored information retrieved is highlighted.

3. An information retrieval system according to claim 1, wherein the stored information includes diagrammatic information, including one or more of: circuit diagrams; electrical diagrams; circuit layout diagrams; hydraulic diagrams; pneumatic diagrams; loop diagrams; and, process flow diagrams.

4. An information retrieval system according to claim 3, wherein the stored information includes non-diagrammatic information, including data sheets.

5. An information retrieval system according to claim 4, wherein, when at least one component depicted in the diagrammatic information is associated with a relevant data sheet regarding that component, the segmenting and linking further includes inputting information such that the selectively segmented and linked stored information retrieved includes the diagrammatic information and the relevant data sheet.

6. An information retrieval system according to claim 5, wherein the at least one component has a unique identifier which is input for association with the selectively segmented and linked stored information.

7. An information retrieval system according to claim 1, wherein, when a state indication is displayed on the user interface, the state indication displayed and related inputs and/or outputs are hyperlinked such that activating the hyperlink retrieves the selectively segmented and linked stored information.

8. An information retrieval system according to claim 1, wherein the selectively segmented and linked stored information retrieved is output by an output device, including being printed by a printer or being transferred to a portable electronic device with a display screen, so that the user can view the selectively segmented and linked stored information retrieved at or near a location where investigation occurs.

9. An information retrieval system according to claim 1, wherein the stored information includes one or more of: alarms, input/output status indications, and potential fault conditions.

10. An information retrieval system according to claim 1, wherein the at least one input component and the at least one output component include any one or more of: physical system inputs and/or outputs, sensors, switches, transmitters, transducers, remote terminal units (RTU's), programmable logic controllers (PLC's), contacts, wires, cables, connections, electrical circuits, electrical components, electro-mechanical components, electronic components, hydraulic components, pneumatic components and actuators.

11. An information retrieval system according to claim 1, wherein the control system includes: a supervisory control and data acquisition (SCADA) system; a programmable logic controller (PLC); or, a de-centralized control system (DCS).

12. An information retrieval system according to claim 1, wherein the user interface is a graphic display.

13. An information retrieval system according to claim 1, wherein the user interface also comprises a user interface of the control system.

14. An information retrieval system according to claim 1, wherein the information retrieval system is embedded within the control system.

15. An information retrieval system according to claim 1 wherein the received state indication produced by the control system is transmitted to and received by the information retrieval system thereby forming a dedicated information request.

16. A method of retrieving information in a plant having processes and/or pieces of equipment, a control system connected with at least one input component and/or at least one output component configured to monitor and control the processes and pieces of equipment, the control system enabled to produce state indications from one or more of:
the at least one input component and/or the at least one output component;
at least one of the processes;
at least one of the pieces of equipment;
a part of the control system; or,
a part of the plant:
an information retrieval system having an interface configured to receive the state indications and an information module configured to store information about the at least one input component, the at least one output component, the processes, the pieces of equipment and the plant, wherein the stored information is linked with the state indications, and wherein the stored information is segmented so that the information linked with a given state indication is relevant to one or more of:
the at least one input component and/or the at least one output component;
the at least one of the processes;
the at least one of the pieces of equipment;
the part of the control system; or
the part of the plant associated with the given state indication;
the information retrieval system also being operably connected with a segmenting and linking module that selectively segments stored information and selectively links the segmented stored information with one or more state indications, the method comprising:
receiving on a user interface in communication with the control system, one or more state indications;
operating the user interface to select a state indication from the one or more received state indications for investigation;
transmitting the received and selected state indication to the information retrieval system, the transmission forming a dedicated information request;
receiving a segmented information display where each segment of information is linked to information relevant to the segment of stored information pertaining to one or more of:
the at least one input component and/or the at least one output component;
the at least one of the processes;
the at least one of the pieces of equipment;
the part of the control system; or,
the part of the plant; and
selecting one or more links to display relevant segmented information relating to the received and selected state indication thereby assisting the investigation process;
wherein, if the stored information is a multipage document, the segmenting and linking further including inputting one or more page numbers containing information relevant to the received and selected state indication, such that the selectively segmented and linked stored information retrieved includes only that page or those pages.

17. A method according to claim 16 wherein the segmenting and linking further includes inputting information such that at least one part of the selectively segmented and linked stored information retrieved is highlighted on the user interface when displayed.

18. A method according to claim 16 wherein the stored information includes diagrammatic information, including one or more of: circuit diagrams; electrical diagrams; circuit layout diagrams; hydraulic diagrams; pneumatic diagrams; loop diagrams; and, process flow diagrams.

19. A method according to claim 18 wherein the stored information includes non-diagrammatic information, including data sheets.

20. A method according to claim 19 wherein when at least one component depicted in the diagrammatic information is associated with a relevant data sheet regarding that component, the segmenting and linking further includes inputting information such that the selectively segmented and linked stored information retrieved includes a link to the diagrammatic information and the relevant data sheet and the link is displayed on the user interface.

21. A method according to claim 20 wherein the at least one component has a unique identifier which is associated with relevant stored information.

22. A method according to claim 16 wherein, when a state indication is displayed on the user interface, the state indication displayed and related inputs and/or outputs are hyperlinked such that activating the hyperlink causes transmission of the dedicated information request that retrieves the relevant stored information.

23. A method according to claim 16 wherein the selectively segmented and linked stored information retrieved is output by an output device including a printer or a portable electronic device with a display screen thus enabling a user to view the selectively segmented and linked stored information retrieved at or near a location where investigation occurs.

24. A method according to claim 16 wherein the stored information includes one or more of: alarms, input/output status indications and, potential fault conditions.

25. A method according to claim 16 wherein the at least one input component and the at least one output component include any one or more of: physical system inputs and/or outputs, sensors, switches, transmitters, transducers, remote terminal units (RTU's), programmable logic controllers (PLC's), contacts, wires, cables, connections, electrical circuits, electrical components, electro-mechanical components, electronic components, hydraulic components, pneumatic components and actuators.

26. A method according to claim 16 wherein the control system includes: a supervisory control and data acquisition (SCADA) system; a programmable logic controller (PLC); or, a de centralized control system (DCS).

27. A method according to claim 16 wherein the user interface is a graphic display.

28. A method according to claim 16 wherein the user interface also comprises a user interface of the control system.

29. A method according to claim 16 wherein the information retrieval system is embedded within the control system.

30. A non-transitory computer readable medium containing computer instruction code which, when executed, implements the method steps defined in claim 16.

* * * * *